UNITED STATES PATENT OFFICE.

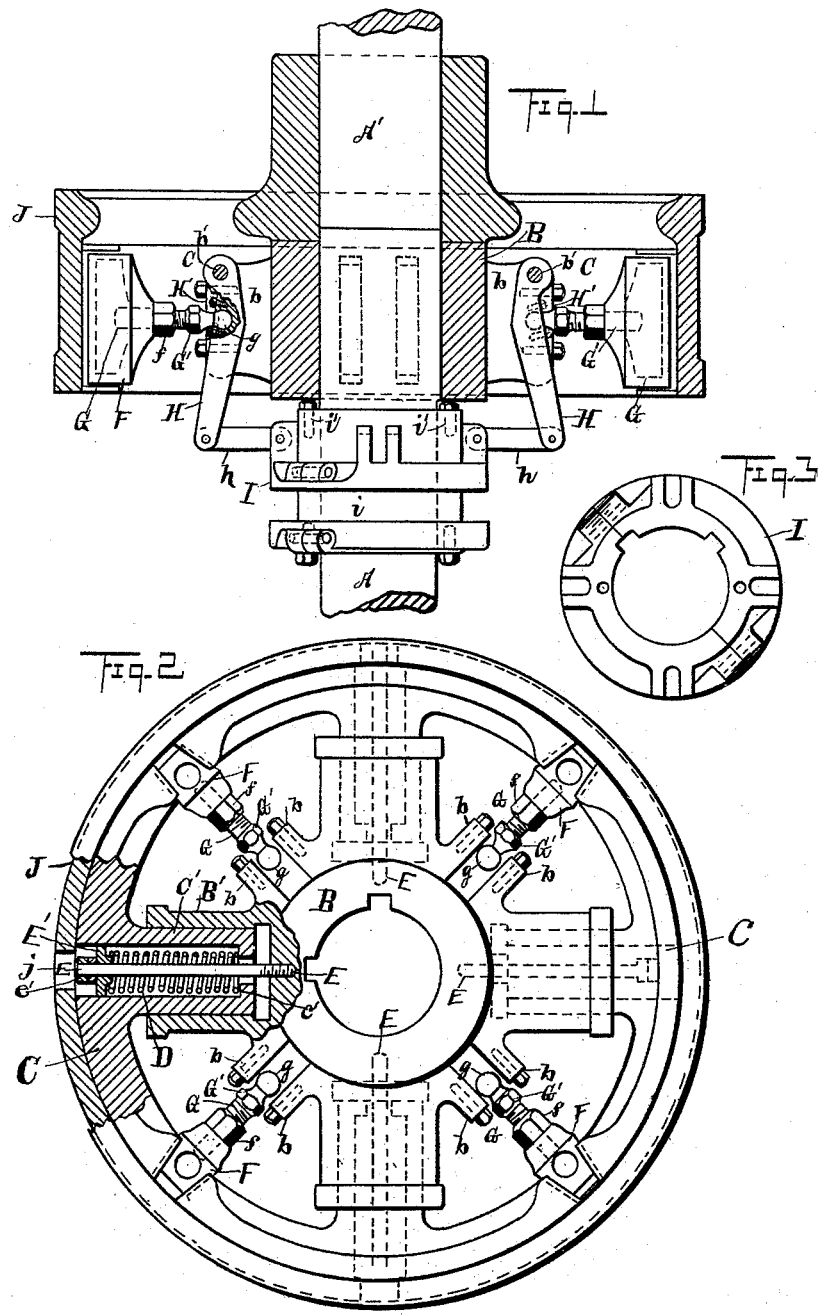

JOHN WALKER, OF CLEVELAND, OHIO.

FRICTION-CLUTCH.

SPECIFICATION forming part of Letters Patent No. 421,333, dated February 11, 1890.

Application filed September 3, 1889. Serial No. 322,898. (No model.)

*To all whom it may concern:*

Be it known that I, JOHN WALKER, of Cleveland, in the county of Cuyahoga and State of Ohio, have invented certain new and useful Improvements in Friction-Clutches; and I do hereby declare the following to be a full, clear, and exact description of the invention, such as will enable others skilled in the art to which it pertains to make and use the same.

My invention relates to improvements in friction-clutches; and it consists in certain features of construction and in combination of parts hereinafter described, and pointed out in the claims.

In the accompanying drawings, Figure 1 is a plan, partly in section. Fig. 2 is a side elevation, partly in section. Fig. 3 is an end view of ring I.

A A are shafts, having an axial line in common.

B is a hub rigidly secured to shaft A, and having a series of radial hollow arms B', each arm having a cylindrical bore.

C C are sections of a friction-band, adapted, when expanded by means of wedges F, to fit rim J, the latter comprising the female member of the clutch, the latter being rigidly secured to shaft A' by means of a suitable hub and connecting web or spider. Each section C of the friction-band has at the center thereof radial hollow arms C', adapted to fit nicely in the bore of an arm B', arms C' at the inner ends thereof having internal annular flanges c'.

D are heavy spiral springs operating, respectively, in the bore of arms C', the inner ends of these springs bearing against the respective flanges c' aforesaid.

E E are screw-rods, the inner ends of which engage screw-threaded holes in hub B, these screw-rods extending radially and centrally through the coils of the respective springs D, the heads e of these rods engaging washers E'. The latter fit in the bore of arms C' and abut the outer ends of the respective springs D. By screwing in rods E springs D are compressed, and the tension of these springs bearing on flanges c' tends to collapse the sectional friction-band. One or more holes j are provided in rim J, through which a socket-wrench may be inserted for turning successively rods E. Wedges F are mounted on screw-rods G, with jam-nuts f to hold them in adjustment, rods G having a section G', adapted to engage a wrench, by means of which the rods may be turned to adjust the wedges.

Rods G terminate, respectively, in balls g, that engage corresponding seats in levers H, the latter being provided with sectional caps H' to hold balls g to their seats in the levers. Levers H are pivoted at h' to and between ears b, the latter being arranged in pairs and projecting from hub B. Levers H are connected by means of links h with collar I. The latter is mounted loosely on shaft A, so as to slide endwise on the shaft, but the collar is held from turning on the shaft by means of the usual arrangement of splines. Collar I is provided in the usual manner with an annular groove i for receiving the prongs of a forked lever (not shown) for shifting the lever in operating the clutch. The collar is provided with set-screws i', projecting toward hub B. By adjusting these set-screws the collar is stopped in such position relative to the hub that links h are brought in position perpendicular to the collar.

The arrangement of sliding collar, links, and levers, as shown, constitutes substantially toggle-joints, by means of which great pressure is applied to the wedges, more especially as the latter are thrust home, and in the position of parts shown in Fig. 1 the collar will maintain its position without fastening by means of the links being perpendicular to the collar.

Caps H' perform important functions, to wit: The backing of the wedges is positively effected by the action of the levers, and consequently does not depend in the least on the tension of springs D in collapsing the friction-band.

The wedges, of course, expand the friction-band against the action of the springs D, and the inward pressure of these springs steadies the movements of the wedges, whereby any sudden jerky movement of the parts is avoided alike in projecting or retiring the wedges.

What I claim is—

1. In a friction-clutch, male and female members, the former comprising a hub having radial sockets, a sectional friction-band, wedges for expanding such band to engage the female member of the clutch, each section of the band having a hollow radial arm adapted, respectively, to fit in the sockets of the hub, springs located inside of and acting radially inward on such arms, and screw-rods for compressing such springs, such screw-rods engaging threaded holes in the hub, substantially as set forth.

2. The combination, with the female member of the friction-clutch, of the male member comprising a driving-hub having radial sockets, a sectional friction-band having arms operating in such sockets of the hub, and a series of wedges, each located in a position to enter between the adjacent edges of two sections of the band for expanding the same, each section of the friction-band having springs acting radially inward in opposition to the wedges, substantially as set forth.

3. In combination, male and female members of a friction-clutch, the former having sectional friction-band, wedges for expanding the band, and levers for operating the wedges, the connection between wedges and levers comprising ball-and-socket joints, whereby the wedges are forced outward and drawn inward by reverse movement of the levers, substantially as set forth.

In testimony whereof I sign this specification, in the presence of two witnesses, this 27th day of June, 1889.

JOHN WALKER.

Witnesses:
   CHAS. H. DORER,
   ALBERT E. LYNCH.